(12) United States Patent
Ito

(10) Patent No.: US 6,982,576 B2
(45) Date of Patent: Jan. 3, 2006

(54) SIGNAL DELAY COMPENSATING CIRCUIT

(75) Inventor: Masahiro Ito, Iwata (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/684,187

(22) Filed: Oct. 10, 2003

(65) Prior Publication Data
US 2004/0124895 A1 Jul. 1, 2004

(30) Foreign Application Priority Data
Oct. 11, 2002 (JP) .................................... P. 2002-298597

(51) Int. Cl.
*H03L 7/00* (2006.01)

(52) U.S. Cl. ...................................... 327/141; 713/600
(58) Field of Classification Search ................ 327/141, 327/144, 145, 154, 161; 375/355, 362, 364; 713/600; 710/29
See application file for complete search history.

(56) References Cited

U.S. PATENT DOCUMENTS

| 6,088,812 A | * | 7/2000 | Houg ........................... 713/600 |
| 6,161,189 A | * | 12/2000 | Arimilli et al. .............. 713/600 |
| 6,259,293 B1 | | 7/2001 | Hayase et al. ............... 327/276 |
| 6,359,479 B1 | * | 3/2002 | Oprescu ...................... 327/141 |

FOREIGN PATENT DOCUMENTS

| JP | 64-23549 | 1/1989 |
| JP | 02-244656 | 9/1990 |
| JP | 05-325586 | 12/1993 |
| JP | 2000-183172 | 6/2000 |
| TW | 483254 | 11/2002 |

OTHER PUBLICATIONS

Taiwanese Office Action for Taiwanese Patent Application No. 92128149 dated May 17, 2005.

* cited by examiner

*Primary Examiner*—Linh My Nguyen
(74) *Attorney, Agent, or Firm*—Pillsbury Winthrop Shaw Pittman LLP

(57) ABSTRACT

A signal delay compensating circuit which is a digital circuit includes: a first semiconductor circuit device (100) having a clock-signal generating circuit (1) and a data processing circuit (2) and adapted to output a data signal in synchronism with a clock signal; and a second semiconductor circuit device (4) to which the output data signal is inputted and which processes the input data signal in synchronism with the clock signal. The clock signal to be supplied from the first semiconductor circuit device (100) to the second semiconductor circuit device (4) is fed back to the data processing circuit (2), and the fed-back clock signal is used as a clock signal at the time of outputting the data signal. A signal delay compensating circuit which effects compensation by following the delay of a reference signal is thereby provided.

4 Claims, 11 Drawing Sheets

SIGNAL DELAY COMPENSATING CIRCUIT

BACKGROUND OF THE INVENTION

The present invention relates to a signal delay compensating circuit for correcting a phase difference between two signals due to a difference in the delay time between a clock signal and a data signal at the time of effecting the transmission and reception of data in synchronism with the clock signal or the like.

In digital circuits for inputting and outputting data in synchronism with a clock signal or the like, the frequency of the clock signal conventionally tends to be high owing to a demand for higher data processing speed. In addition, circuits and the like which share the same clock signals have come to increase as semiconductor integrated circuits and systems using them have come to adopt multifunctions. The load of clock signal lines has also increased in conjunction with this trend. Accordingly, in a circuit for handling a high-frequency clock signal, the effect of an increase in the load causes a delay of the clock signal, and lacks a balance with the delay of data, with the result that there is a possibility that the phase difference brings about a serious problem in the operation of the circuit. To cope with such a problem, a proposal has been made in which a latch circuit for synchronizing the semiconductor circuit device from an external circuit is provided in an input/output buffer portion of the semiconductor device (e.g., refer to JP-A-64-23549).

FIGS. 10 and 11 show a conventional circuit configuration and voltage waveforms of respective portions of the circuit.

This circuit is comprised of a semiconductor circuit device 100 and a receiving circuit 4. The semiconductor circuit device 100 is configured by a clock-signal generating circuit 1, a data processing circuit 2, a latch circuit 3, output buffer circuits 6a and 6b, a data input terminal 7, a clock output terminal 8, and a data output terminal 9. The clock-signal generating circuit 1 is a circuit for generating a master clock signal serving as a reference for the circuit operation. The data processing circuit 2 processes a data signal inputted to the data input terminal 7 by a predetermined procedure, and outputs the data signal to the latch circuit 3 in synchronism with the master clock signal.

The latch circuit 3 temporarily stores the data signal outputted from the data processing circuit 2, and outputs the data signal to the receiving circuit 4 via the data output terminal 8 in synchronism with the master clock signal. The receiving circuit 4 is a circuit for fetching the input data signal in synchronism with the master clock signal. A load 5 is one which is based on an external environment such as the stray capacitance and the impedance of a wiring pattern and the like.

In such a conventional circuit, even if processing for matching the phases of the master clock signal (see the signal A in FIG. 11) and the output data signal (see the signal C in FIG. 11) is effected on the output side of the data signal, the master clock signal inputted to the receiving circuit 4 is delayed (see the signals B and D in FIG. 11) due to the effect of the load based on the external environment. As a result, the phase relationship between the output data signal and the master clock signal on the receiving circuit 4 side, i.e., the amount of relative delay between the two signals, changes.

Such a situation results in cutting a margin in transmission on the receiving circuit 4 side (e.g., setup time and hold time), which leads to instability in the transmission of the data signal and a transmission error of the data signal. In particular, in a system in which data is transmitted with the same phase as that of the master clock signal, the output timing of the data signal is slightly delayed as compared to the master clock signal on the precondition that transmission processing of the data signal is effected with respect to a clock signal. Therefore, if an attempt is made to secure the setup time on the receiving circuit 4 side, the effect of the external load cannot be ignored.

SUMMARY OF THE INVENTION

Accordingly, the present invention has been devised in view of the above-described problems, and its object is to provide a signal delay compensating circuit in which even if a reference signal for inputting and outputting a data signal is delayed due to the effect of an external load or the like, circuit operation such as the outputting of data can be effected by following this delay.

To attain the above object, the invention proposes the following means.

The invention according to a first aspect proposes a signal delay compensating circuit which is a digital circuit, comprising: a first semiconductor circuit device having a clock-signal generating circuit and a data processing circuit and adapted to output a data signal in synchronism with a clock signal; and a second semiconductor circuit device to which the output data signal is inputted and which processes the input data signal in synchronism with the clock signal, wherein the clock signal to be supplied from the first semiconductor circuit device to the second semiconductor circuit device is fed back to the data processing circuit, and the fed-back clock signal is used as a clock signal at the time of outputting the data signal.

According to this aspect of the invention, the clock signal delayed due to the effect of an external load or the like is fed back to the data processing circuit, and data is outputted in synchronism with the fed-back clock signal, thereby making it possible to correct the amount of relative delay between an output circuit and an input circuit.

Concerning the signal delay compensating circuit according to the first aspect, the invention according to a second aspect proposes a signal delay compensating circuit in which the clock signal is fed back from a clock signal input terminal of the second semiconductor circuit device to the data processing circuit.

According to this aspect of the invention, since the clock signal is fed back from the clock signal input terminal of the second semiconductor circuit device, it is possible to effectively compensate for a delay of the signal with respect to a so-called load of a distributed constant in which the load increases in proportion to the length of the transmission path.

Concerning the signal delay compensating circuit according to the first aspect, the invention according to a third aspect proposes a signal delay compensating circuit in which the clock signal is fed back from a clock signal output terminal inside the first semiconductor circuit device to the data processing circuit.

According to this aspect of the invention, since the clock signal is fed back inside the semiconductor circuit device to the data processing circuit, it is possible to compensate for a delay of the signal without providing a terminal for inputting a clock signal from an external circuit.

The invention according to a fourth aspect proposes a signal delay compensating circuit which is a digital circuit, comprising: a storage device for storing data in such a manner as to be capable of writing or reading; and a semiconductor circuit device having an access timing signal generating circuit for writing the data in the storage device and adapted to read the data from or write the data in the storage data, wherein an access timing signal to be supplied from the semiconductor circuit device to the storage device is fed back to the semiconductor circuit device, and a reference signal for allowing the semiconductor circuit device to output the write data is made active in a case where both the fed-back signal and a signal outputted from the access timing signal generating circuit are active.

According to this aspect of the invention, since the reference signal for outputting the write data is generated by a logical operation of the access timing signal and the fed-back signal, it is possible to avoid a conflict between the write data and the read data occurring due to the delay of the access timing signal.

DETAILED DESCRIPTION OF PREFERRED EMBODIMENTS

Figure 1:
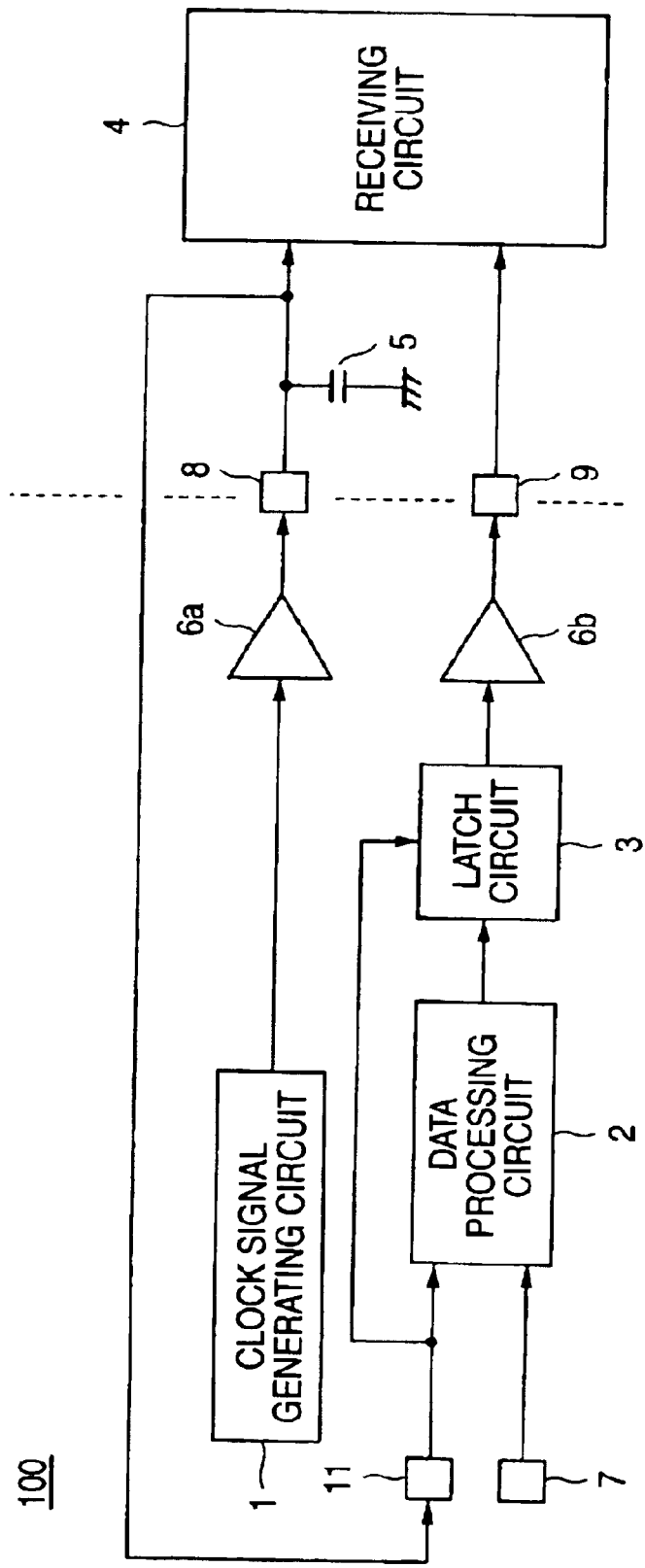
FIG. 1 is a circuit diagram in accordance with a first embodiment of the invention.
Figure 10:
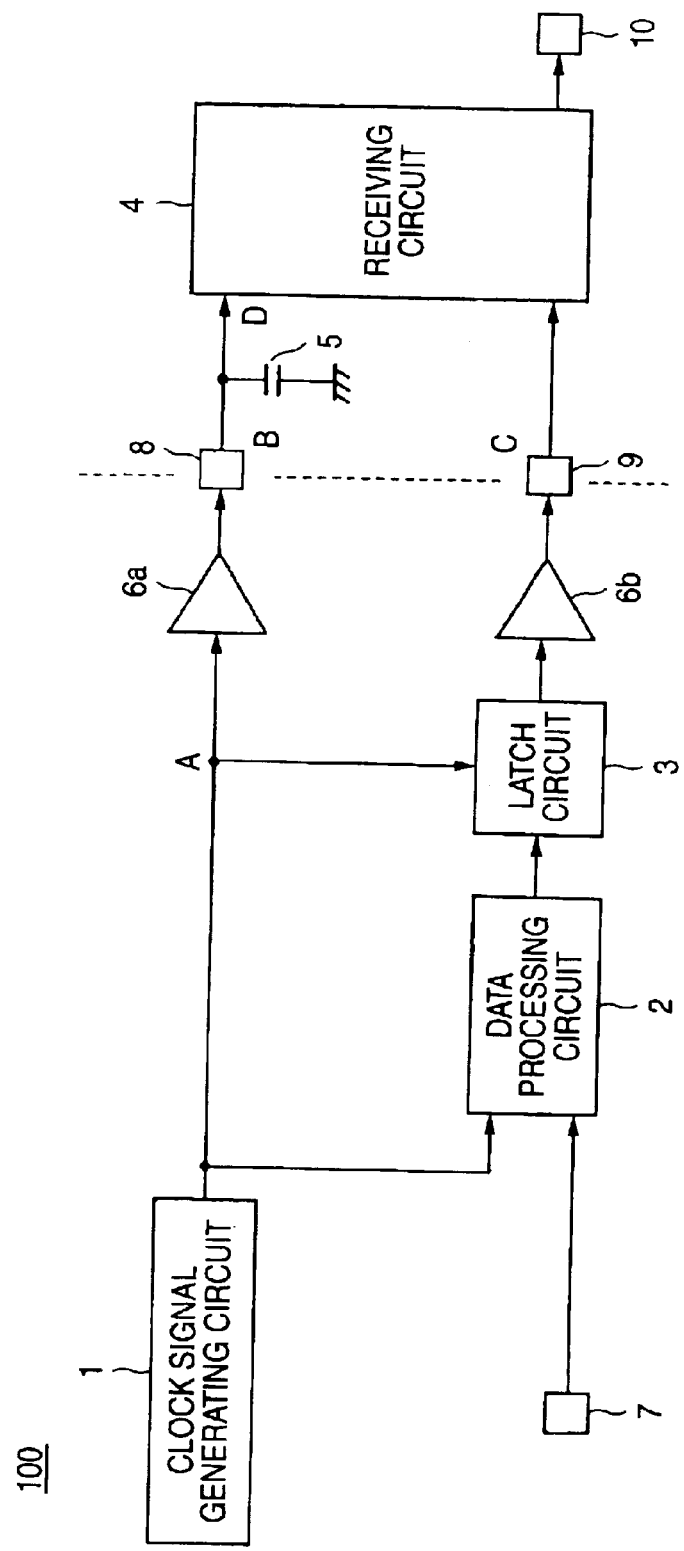
FIG. 10 is a circuit diagram in accordance with a conventional example.
Figure 11:
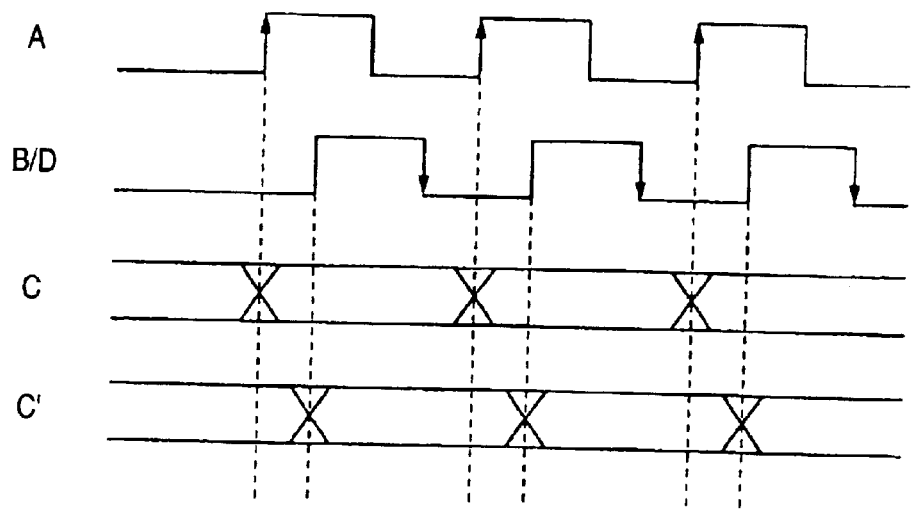
FIG. 11 is a diagram illustrating voltage waveforms of respective portions of the circuit in accordance with the conventional example.

Referring now to FIGS. 1 to 9, a detailed description will be given of the signal delay compensating circuit in accordance with the embodiments of the invention.
First Embodiment As shown in FIG. 1, the signal delay compensating circuit in accordance with a first embodiment of the invention has a configuration similar to that of the circuit described earlier with reference to FIG. 10. The difference lies in that a clock signal supplied from a clock-signal generating circuit 1 to a clock signal input terminal of a receiving circuit 4 is fed back from that input terminal to a data processing circuit 2 and a latch circuit 3, and this clock signal is used as a reference signal in the operation of these circuits. It should be noted that a semiconductor circuit device 100 in accordance with this embodiment is provided with an exclusive input terminal 11 to allow the clock signal to be fed back from a particular node.

Figure 2:
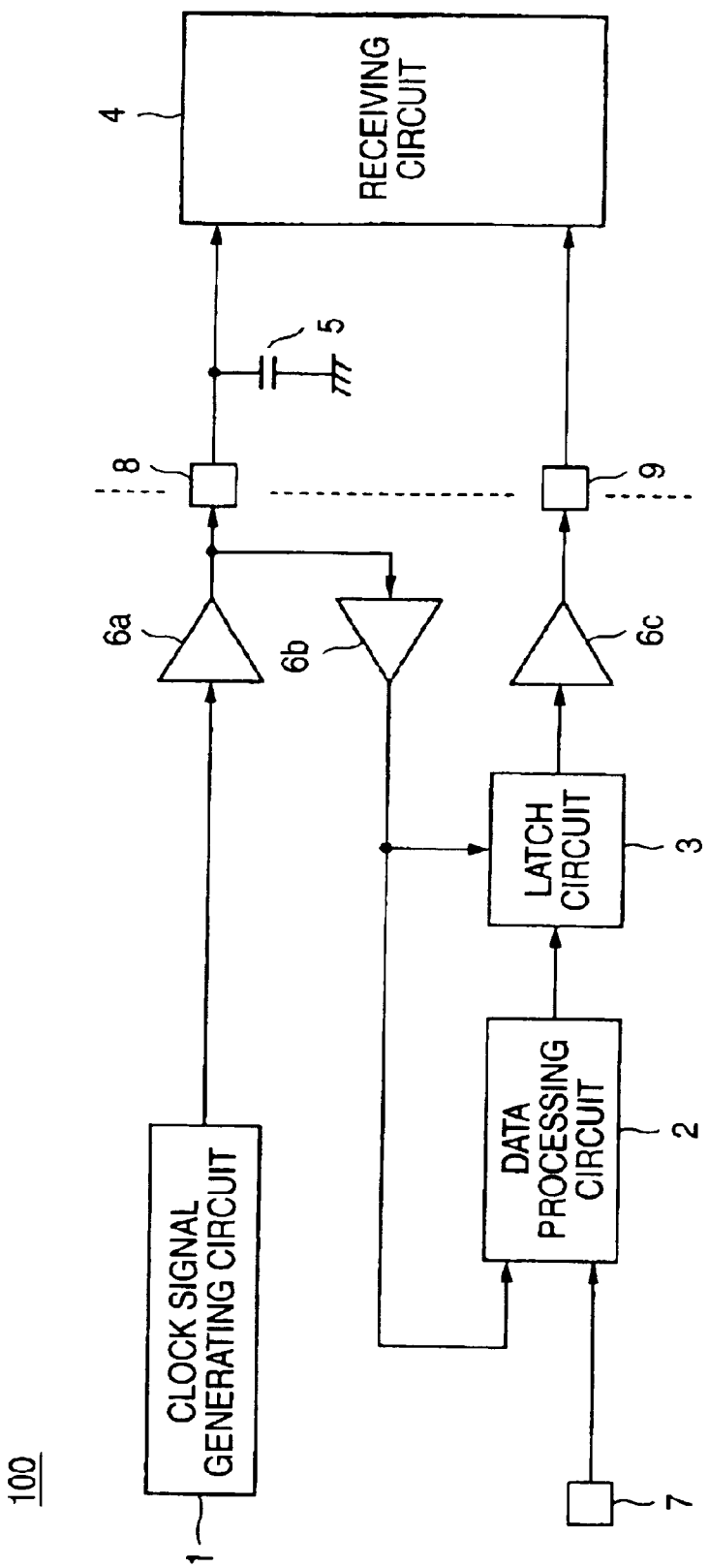
FIG. 2 is a circuit diagram in accordance with a second embodiment of the invention.

In the signal delay compensating circuit in accordance with this embodiment, since the clock signal is fed back from the clock signal input terminal of the receiving circuit 4, it becomes possible to correct the clock signal reflecting an external load factor from a clock signal output terminal 8 of the semiconductor circuit device 100 to the clock signal input terminal of the receiving circuit 4.
Second Embodiment As shown in FIG. 2, the signal delay compensating circuit in accordance with a second embodiment of the invention is configured such that buffer circuits (two-way) 6a and 6b are provided for the output of the clock signal in the signal delay compensating circuit in accordance with the first embodiment, and a node connected to the receiving circuit 4 as the output terminal 8 of the clock signal is fed back to the data processing circuit 2 by the buffer circuit (two-way) 6b.

Figure 3:
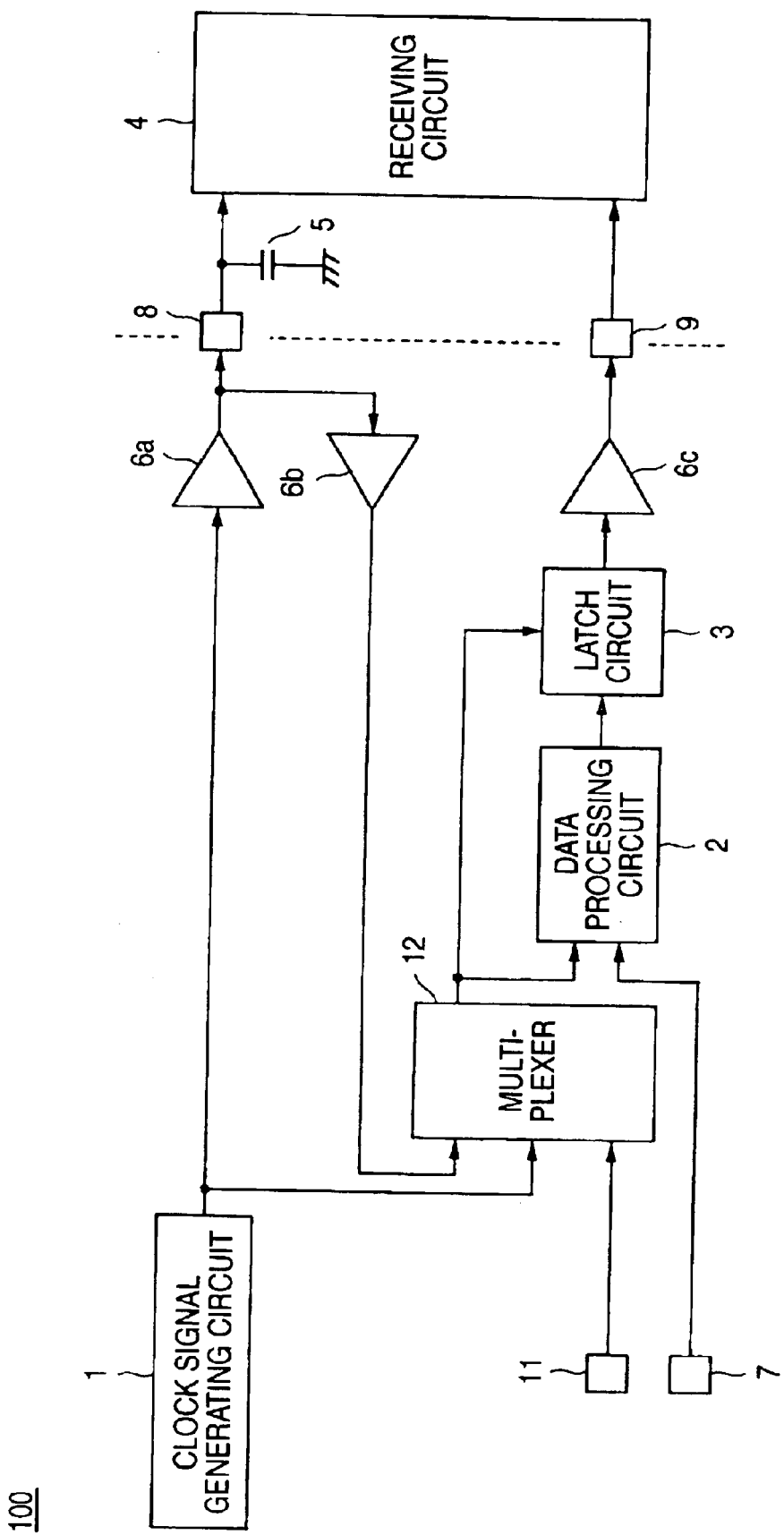
FIG. 3 is a circuit diagram in accordance with a third embodiment of the invention.

In the case of the signal delay compensating circuit in accordance with the first embodiment of the invention, in view of the fact that the clock signal is fed back from an external circuit, the exclusive terminal 11 for inputting it is required. However, in a case where the number of terminals is restricted due to such as the specifications of the semiconductor circuit device 100, there are cases where it is difficult to realize the exclusive terminal 11. According to the signal delay compensating circuit in accordance with this embodiment, since the configuration provided is such that the clock signal is fed back to the data processing circuit 2 inside the semiconductor circuit device 100, even in such a case correction of the clock signal becomes possible without increasing the number of terminals.
Third Embodiment As shown in FIG. 3, in the signal delay compensating circuit in accordance with a third embodiment, the semiconductor circuit device 100 in accordance with the invention is configured by comprising, in the conventional configuration, the input terminal 11 for allowing the clock signal supplied from the clock-signal generating circuit 1 to the clock signal input terminal of the receiving circuit 4 to be fed back from that input terminal to the data processing circuit 2 and the latch circuit 3; the buffer circuits (two-way) 6a and 6b for feeding back inside the semiconductor circuit device 100 the clock signal to be outputted to the receiving circuit 4; and a multiplexer 12 to which these signals and the clock signal outputted from the clock-signal generating circuit 1 are inputted, and which selectively outputs them. It should be noted that the multiplexer 12 is adapted to selectively output the respective signals by a control signal from an unillustrated controller.

The signal delay compensating circuit in accordance with this embodiment has been made in view of actual use in the case where this semiconductor circuit device is used in an actual system and in view of problems in tester inspection in the manufacturing process of this semiconductor circuit device. Namely, in product inspection by using a tester, there is a problem in that the strobe point of an expected value of the output cannot be set in a case where the phase varies due to the delay of the output data as an external load depends on the tester and an inspecting board.

To overcome such a problem, it is desirable to provide a configuration to allow an optimum signal to be selected in correspondence with the respective conditions of the inspection and the actual use. For example, in the product inspection by using the tester, inspection may be effected by using the clock signal outputted from the clock-signal generating circuit 1. Meanwhile, in the case where the semiconductor circuit device is incorporated in the system, the clock signal supplied from the clock-signal generating circuit 1 to the clock signal input terminal of the receiving circuit 4 may be used by being fed back from that input terminal to the data processing circuit 2 and the latch circuit 3. Alternatively, the clock signal to be outputted to the receiving circuit 4 may be used by being fed back inside the semiconductor circuit device 100 by using the buffer circuits (two-way) 6a and 6b.

In this embodiment, since an arrangement is provided to satisfy such a requirement by using the multiplexer 12, the selection of an optimum signal can be effected in correspondence with the respective conditions. In addition, the circuit configuration in accordance with the first embodiment and the circuit configuration in accordance with the second embodiment can be arbitrarily selected by taking into the requirements of the overall system into consideration, so that the range of application expands in such an aspect as well.

Fourth Embodiment

Figure 4:
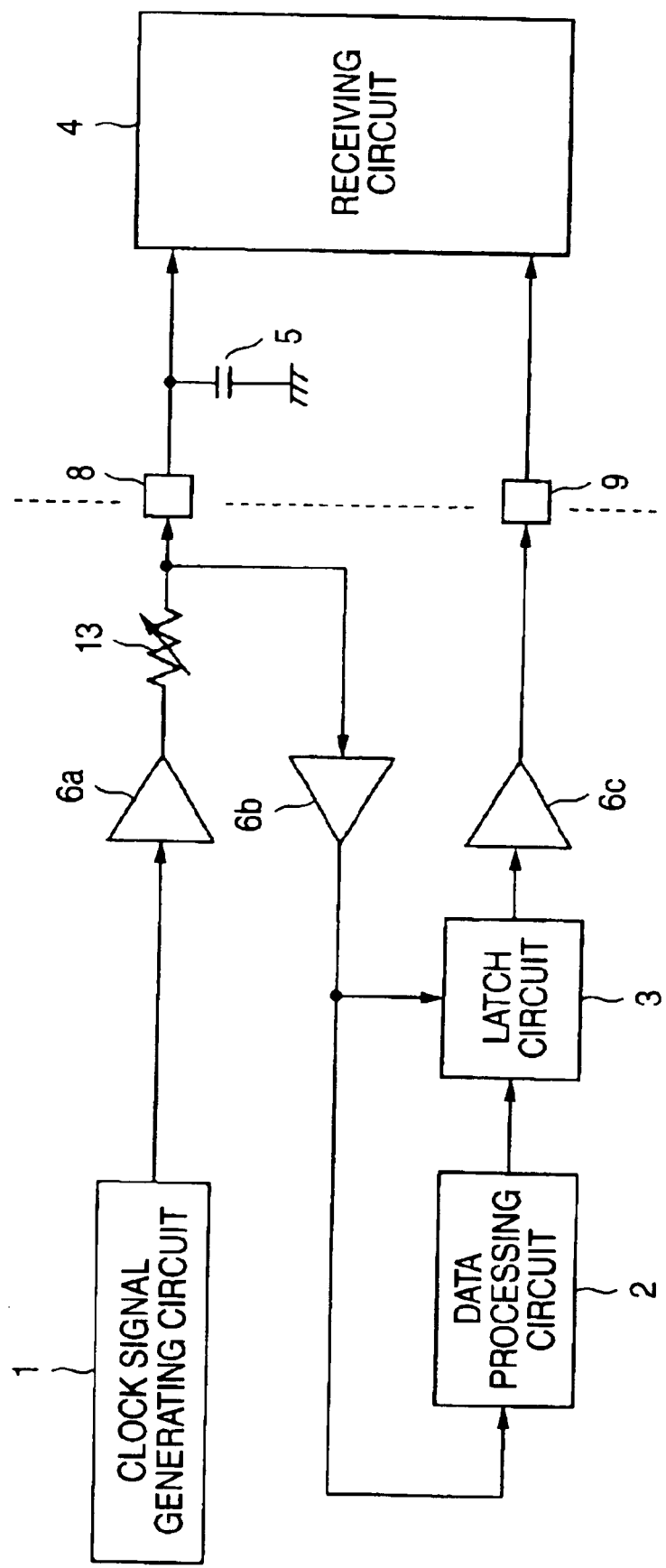
FIG. 4 is a circuit diagram in accordance with a fourth embodiment of the invention.

As shown in FIG. 4, the signal delay compensating circuit in accordance with a fourth embodiment of the invention is configured such that a damping resistor Rd (reference numeral 13) is added to the signal delay compensating circuit in accordance with the second embodiment of the internal feedback type. Owing to a demand for high-speed operation in recent systems, with respect to the clock output, a design is generally made to increase the driving capabilities of output buffer circuits 6 to prevent the delay and transient deterioration of the signal due to the effect of an external load.

However, if the driving capabilities of the output buffer circuits 6 become high, various drawbacks can possibly occur such as unwanted radiation, overshoots or undershoots of the clock signal, or reflection from a circuit pattern. As a measure for coping with these drawbacks, there is a method in which the damping resistor Rd is inserted in the output of the buffer circuit 6. However, although the resistance value of this damping resistor Rd is generally set to be equivalent to the system, the damping resistor Rd constitutes an additional load, leading to the occurrence of a delay in the output of the output buffer circuit 6 as well as variations in the phase relationship accompanying it. Hence, it has been conventionally difficult to incorporate the damping resistor Rd in the semiconductor circuit device.

Figure 5A:
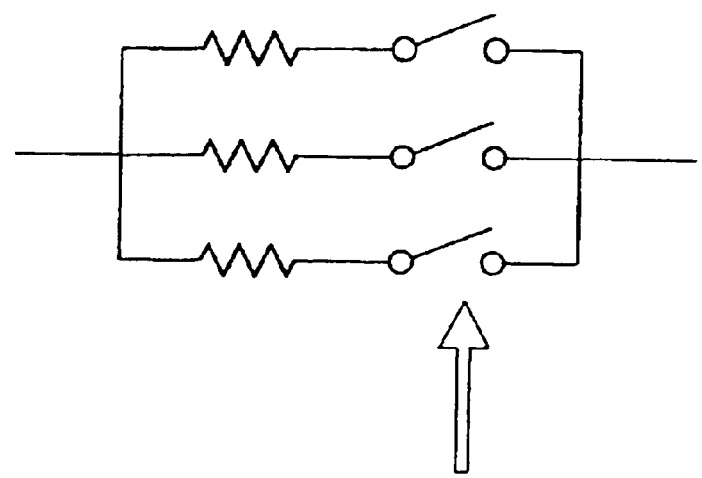
FIGS. 5A and 5B are diagrams illustrating examples of configurations in a case where a damping resistor in accordance with the fourth embodiment of the invention is made variable.
Figure 5B:
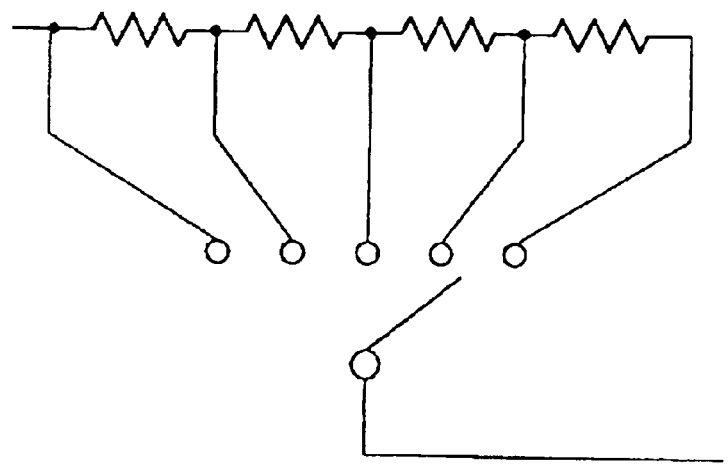

According to the signal delay compensating circuit in accordance with this embodiment, since the configuration provided is such that the clock signal is fed back in the internal circuit, even if the damping resistor Rd is added, it is possible to automatically follow the delay in the output of the output buffer circuit 6 as well as variations in the phase relationship accompanying it. In addition, if the damping resistor Rd added is arranged to be variable, as shown in FIGS. 5A and 5B, it becomes possible to effect optimum adjustment capable of simultaneously coping with the problem of noise such as unwanted radiation and the problem of the delay in the output of the output buffer circuit due to the load.

Fifth Embodiment

Figure 6:
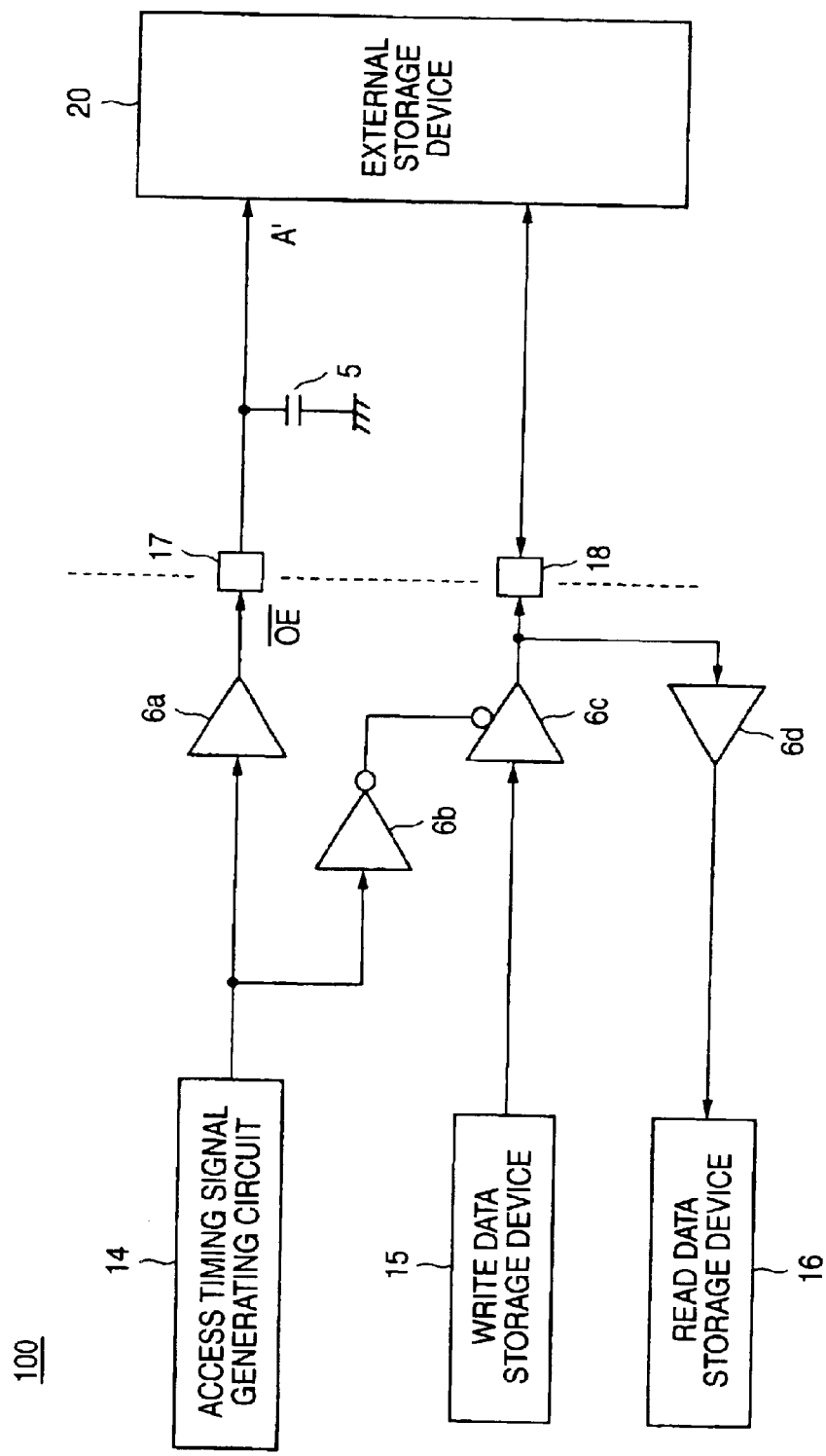
FIG. 6 is a circuit diagram concerning a conventional example in accordance with a fifth embodiment of the invention.

Another example of the circuit configuration of a conventional technique is shown in FIG. 6. As shown in the drawing, the circuit configuration of the conventional technique is provided with an access timing generating circuit 14, a write data storage device 15, a read data storage device 16, buffer circuits 6a, 6b, 6c, and 6d, and an external storage device 20.

The access timing generating circuit 14 is a reference signal generating circuit for writing and reading data. In this circuit, an access timing signal (designated at OE in the drawing) is inputted to the external storage device 20 through the output buffer circuit 6a, and write data is outputted to the external storage device 20 by using this signal. Then, in the external storage device 20, data is fetched in synchronism with the access timing signal.

In this circuit, however, the following problem was encountered since the access timing signal is delayed due to the effect of the external load. Namely, if the signal inputted to the external storage device 20 is delayed (designated at A' in FIGS. 7 and 9) with respect to the access timing signal OE (negative logic) due to the effect of the external load, the data fetching timing in the external storage device 20 is delayed. In the circuit of this embodiment, since the writing and reading of the data are alternately effected at predetermined timings, if a timing delay occurs between the access timing signal OE (negative logic) and the signal A' inputted to the external storage device 20, a data conflict (bus conflict) results (see the DATABUS in FIG. 7). The signal delay compensating circuit in accordance with this embodiment has been made to cope with such a problem.

Figure 8:
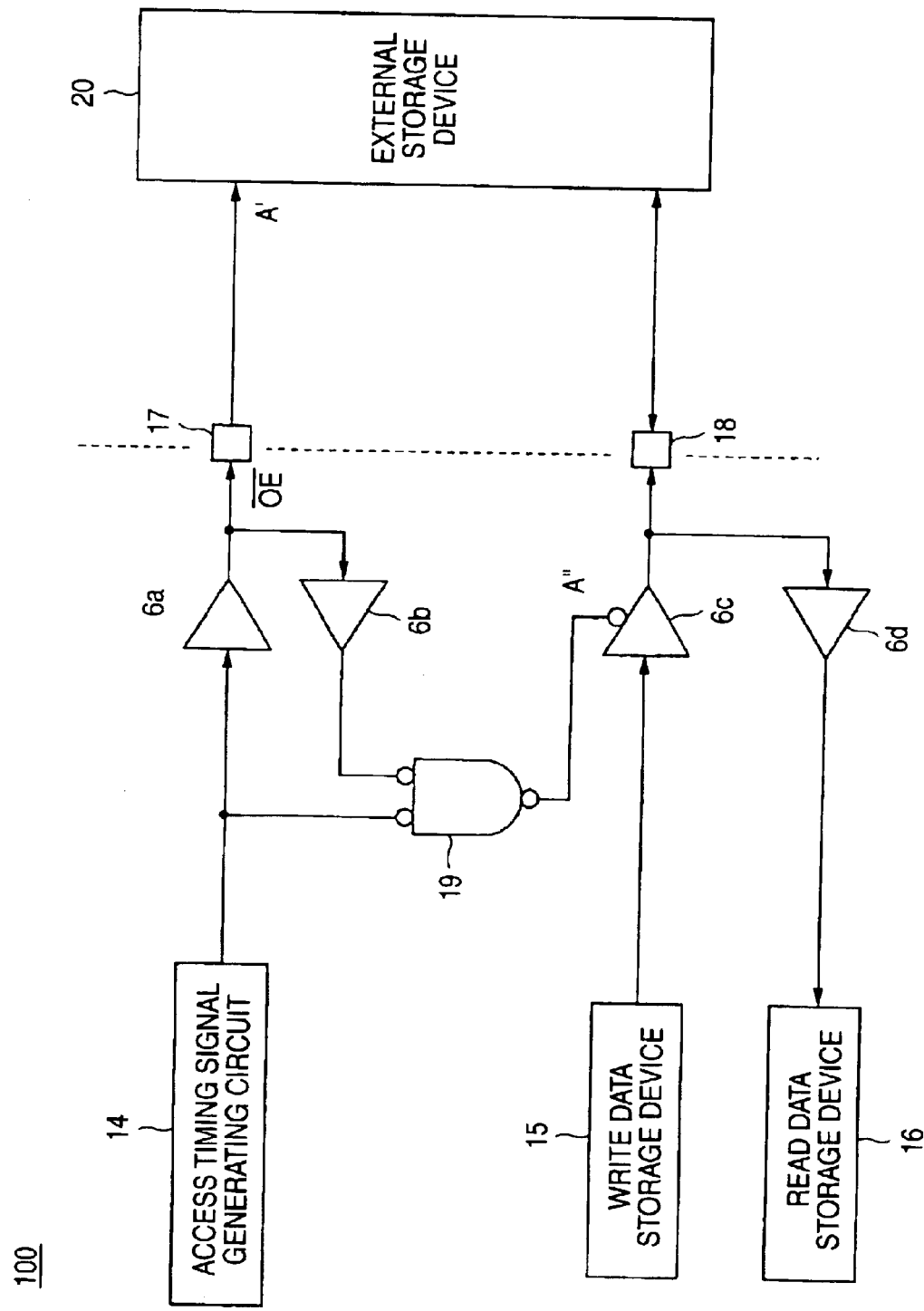
FIG. 8 is a circuit diagram in accordance with the fifth embodiment of the invention.
Figure 9:
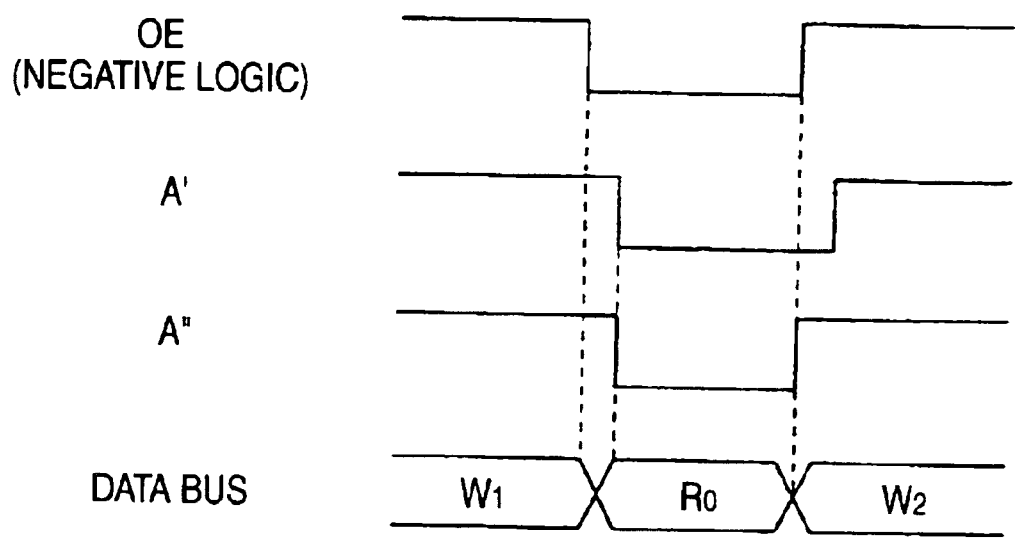
FIG. 9 is a diagram illustrating voltage waveforms of the respective portions in the circuit in accordance with the fifth embodiment of the invention.

As shown in FIG. 8, the signal delay compensating circuit in accordance with this embodiment has, in addition to the conventional circuit configuration, a negative logic AND circuit 19 for generating an access timing signal necessary for outputting write data. Namely, in the signal delay compensating circuit in accordance with this embodiment, the access timing signal to be supplied to the external storage device 20 and a signal in which this access timing signal is fed back in the internal circuit are inputted to the negative logic AND circuit 19. If either one of the m is at the high level, a low level signal is outputted, and in the other cases a high level signal is outputted. By using such a signal, an output timing signal A" for the write data on the semiconductor circuit device side is generated (see A" in FIG. 9).

Figure 7:
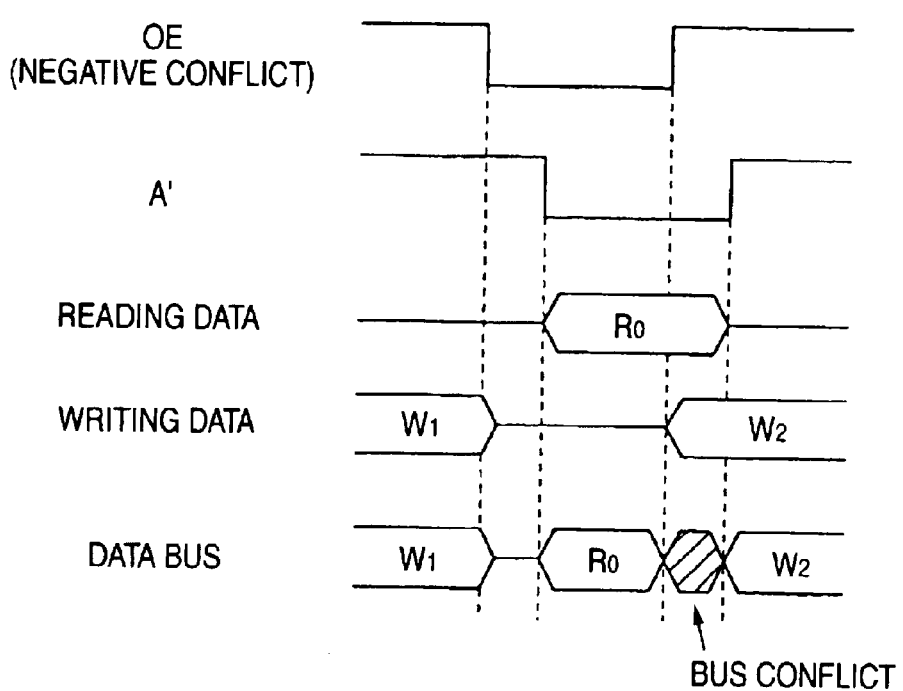
FIG. 7 is a diagram illustrating voltage waveforms of respective portions in the circuit of the conventional example in accordance with the fifth embodiment of the invention.

Namely, the access timing signal to be supplied to the external storage device 20 and a signal in which this access timing signal is fed back in the internal circuit are inputted to the negative logic AND circuit 19, and the output timing signal A" for the write data on the semiconductor circuit device side is thereby generated. Thus only during the time when both the access timing signal OE (negative logic) and the signal A' to be inputted to the external storage device 20 in FIG. 7 are at the low level (enable state), the write data is outputted to the external storage device 20. Therefore, it is possible to avoid the conflict between the write data and the read data.

Although a detailed description has been given of the embodiments of the invention with reference to the drawings, specific configurations are not limited to these embodiments, and it should be construed that designs falling within the range that does not depart from the gist of the invention are included. For example, although in the first embodiment an example has been shown in which the clock signal is fed back from the clock signal input terminal of the receiving circuit to the semiconductor circuit device, a terminal capable of fetching to an external circuit the clock signal supplied to the receiving circuit may be separately provided in the receiving circuit, and the clock signal maybe fed back from this terminal. In this case, it is possible to realize signal delay compensation which takes into consideration the state of the load in the receiving circuit.

As described above, in accordance with the invention, the clock signal is fed back from the clock signal input terminal of the receiving circuit, and this fed-back signal is used as a reference signal at the time of outputting data. Therefore, there is an advantage in that signal delay compensation which takes the condition of an external load into consideration can be realized without requiring a special circuit.

In addition, since the configuration provided is such that the clock signal to be supplied to the receiving circuit is fed back in the internal circuit, there is an advantage in that a system for effecting signal delay compensation can be configured even in a case where the number of terminals is restricted in terms of the specifications of the semiconductor circuit device.

In addition, the output timing signal for the write data on the semiconductor circuit device side is generated by using the access timing signal to be supplied to the external storage device and a signal obtained by feeding back this access timing signal in the internal circuit. Therefore, advantages are offered in that even if the access timing signal is delayed due to the effect of an external load, the conflict on the data bus can be avoided, and it is possible to prevent in advance the occurrence of noise and in which a situation the service life of the device is affected.

What is claimed is:

1. A digital signal delay compensating circuit:

a first semiconductor circuit device including a clock-signal generating circuit and a data processing circuit for outputting a data signal in synchronism with a clock signal generated by the clock-signal generating circuit; and a second semiconductor circuit device to which the data signal output from the first semiconductor circuit device is inputted and which processes the data signal in synchronism with the clock signal, wherein the clock signal to be supplied from the first semiconductor circuit device to the second semiconductor circuit device is fed back to the data processing circuit, and the fed-back clock signal is used as a clock signal at the time of outputting the data signal.

2. A digital signal delay compensating circuit:

a first semiconductor circuit device including a clock-signal generating circuit and a data processing circuit for outputting a data signal in synchronism with a clock signal generated by the clock-signal generating circuit; and a second semiconductor circuit device to which the data signal output from the first semiconductor circuit device is inputted and which processes the data signal in synchronism with the clock signal, wherein the clock signal to be supplied from the first semiconductor circuit device to the second semiconductor circuit device is fed back to the data processing circuit, and the fed-back clock signal is used as a clock signal at the time of outputting the data signal and the clock signal is fed back from a clock signal input terminal of the second semiconductor circuit device to the data processing circuit.

3. The signal delay compensating circuit according to claim 1, wherein the clock signal is fed back from a clock signal output terminal inside the first semiconductor circuit device to the data processing circuit.

4. A digital signal delay compensating circuit comprising:

a storage device capable of writing data therein; and a semiconductor circuit device including an access timing signal generating circuit for writing the data in the storage device and configured to write the data in the storage data, wherein an access timing signal to be supplied from the semiconductor circuit device to the storage device is fed back to the semiconductor circuit device, and a reference signal for allowing the semiconductor circuit device to output data to be written in the storage device is made active in a case where both the fed-back signal and a signal outputted from the access timing signal generating circuit are active.

* * * * *